(12) United States Patent  
Hasegawa et al.

(10) Patent No.: US 8,730,292 B2  
(45) Date of Patent: May 20, 2014

(54) SCANNING OPTICAL DEVICE THAT SCANS PHOTORECEPTOR WITH LASER LIGHT AND IMAGE FORMING APPARATUS

(75) Inventors: Ryo Hasegawa, Hachioji (JP); Shinji Morita, Kunitachi (JP); Yuji Okugawa, Hachioji (JP); Shinichi Nagao, Koganei (JP)

(73) Assignee: Konica Minolta Business Technologies, Inc. (JP)

(*) Notice: Subject to any disclaimer, the term of this patent is extended or adjusted under 35 U.S.C. 154(b) by 0 days.

(21) Appl. No.: 13/478,248

(22) Filed: May 23, 2012

(65) Prior Publication Data

US 2012/0306989 A1 Dec. 6, 2012

(30) Foreign Application Priority Data

Jun. 2, 2011 (JP) ................................. 2011-123870

(51) Int. Cl.  
*B41J 15/14* (2006.01)  
*B41J 27/00* (2006.01)

(52) U.S. Cl.  
USPC ............................ 347/261; 347/231; 347/243

(58) Field of Classification Search  
USPC .................. 347/231, 241–245, 256–261, 263  
See application file for complete search history.

(56) References Cited

U.S. PATENT DOCUMENTS

| 5,506,719 A * | 4/1996 | Murakami et al. ......... 359/216.1 |
| 2010/0046984 A1 | 2/2010 | Tomioka |
| 2010/0097646 A1 | 4/2010 | Yamawaki |
| 2010/0296822 A1 | 11/2010 | Takada |

FOREIGN PATENT DOCUMENTS

| CN | 1102481 A | 5/1994 |
| CN | 101096149 A | 6/2007 |
| JP | 5-196884 A | 8/1993 |
| JP | 8-15935 A | 1/1996 |
| JP | 8-262363 A | 10/1996 |
| JP | 11-052267 A | 2/1999 |
| JP | 2010-276983 A | 12/2010 |

OTHER PUBLICATIONS

Japanese Notification of Reasons for Refusal for Japanese Patent Application No. 2011-123870; Date of Mailing: Aug. 27, 2013, with English Translation.  
First Office Action for the Chinese Application No. 201210162757.1 2014. dated Jan. 30, 2014. English translation attached.

* cited by examiner

*Primary Examiner* — Hai C Pham  
(74) *Attorney, Agent, or Firm* — Cantor Colburn LLP

(57) ABSTRACT

A scanning optical device that scans a photoreceptor with laser light includes a light source, a light outputting section, and a projection. The laser light from the light source is output through the light outputting section so that the photoreceptor is irradiated with the laser light. The projection projects through a partition wall toward the photoreceptor. The light outputting section is disposed in a position separated from the photoreceptor by the partition wall. The projection contains a polygon motor that rotates a polygon mirror to reflect the laser light.

4 Claims, 6 Drawing Sheets

SCANNING OPTICAL DEVICE THAT SCANS PHOTORECEPTOR WITH LASER LIGHT AND IMAGE FORMING APPARATUS

BACKGROUND OF THE INVENTION

1. Field of the Invention

The present invention relates to a scanning optical device that scans a photoreceptor with laser light and relates to an image forming apparatus.

2. Description of Related Art

An image forming apparatus is known which scans an external peripheral surface of a charged photoreceptor with laser light to form an electrostatic latent image on the external peripheral surface and then develops the electrostatic latent image with a developer to form a toner image on the photoreceptor. In such an image forming apparatus, a partition wall is provided between the photoreceptor and a scanning optical device that scans the photoreceptor with laser light, in order to prevent contamination of the scanning optical device due to toner adhering to the photoreceptor. Providing a partition wall increases the distance between the photoreceptor and the scanning optical device, resulting in an increase in the size of the image forming apparatus. To address this circumstance, an image forming apparatus shown in FIG. 6 has a scanning optical device partially projecting through a partition wall 103 toward a photoreceptor 102, thus reducing the space for disposing the photoreceptor 102 and the scanning optical device (e.g., Japanese Unexamined Patent Application Publication No. 8-15935).

In the image forming apparatus disclosed in Japanese Unexamined Patent Application Publication No. 8-15935, however, a light outputting section 101 that radiates laser light onto the photoreceptor 102 projects through the partition wall 103 toward the photoreceptor 102. Thus, particles such as toner scattering from the photoreceptor 102 may adhere to and cause contamination of the light outputting section 101, preventing radiation of the laser light and resulting in a defective image.

SUMMARY OF THE INVENTION

The present invention provides a scanning optical device and an image forming apparatus that prevent contamination of a light outputting section of the scanning optical device, with the scanning optical device partially projecting through a partition wall toward a photoreceptor in the image forming apparatus.

According to a first aspect of the present invention, there is provided a scanning optical device that scans a photoreceptor with laser light, the scanning optical device including: a light source; a light outputting section through which the laser light from the light source is output so that the photoreceptor is irradiated with the laser light; and a projection that projects through a partition wall toward the photoreceptor, wherein the light outputting section is disposed in a position separated from the photoreceptor by the partition wall; and the projection contains a polygon motor that rotates a polygon mirror to reflect the laser light.

Preferably, the scanning optical device further includes: an optical system that changes a traveling direction of the laser light from the light source to allow the laser light to travel to the light outputting section, wherein the optical system is disposed in a position separated from the photoreceptor by the partition wall.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DESCRIPTION OF THE PREFERRED EMBODIMENTS

An image forming apparatus A according to an embodiment of the present invention is described in detail below with reference to the attached drawings. The embodiment is presented as an example of the present invention and is not construed as a limitation thereof.

Figure 1:
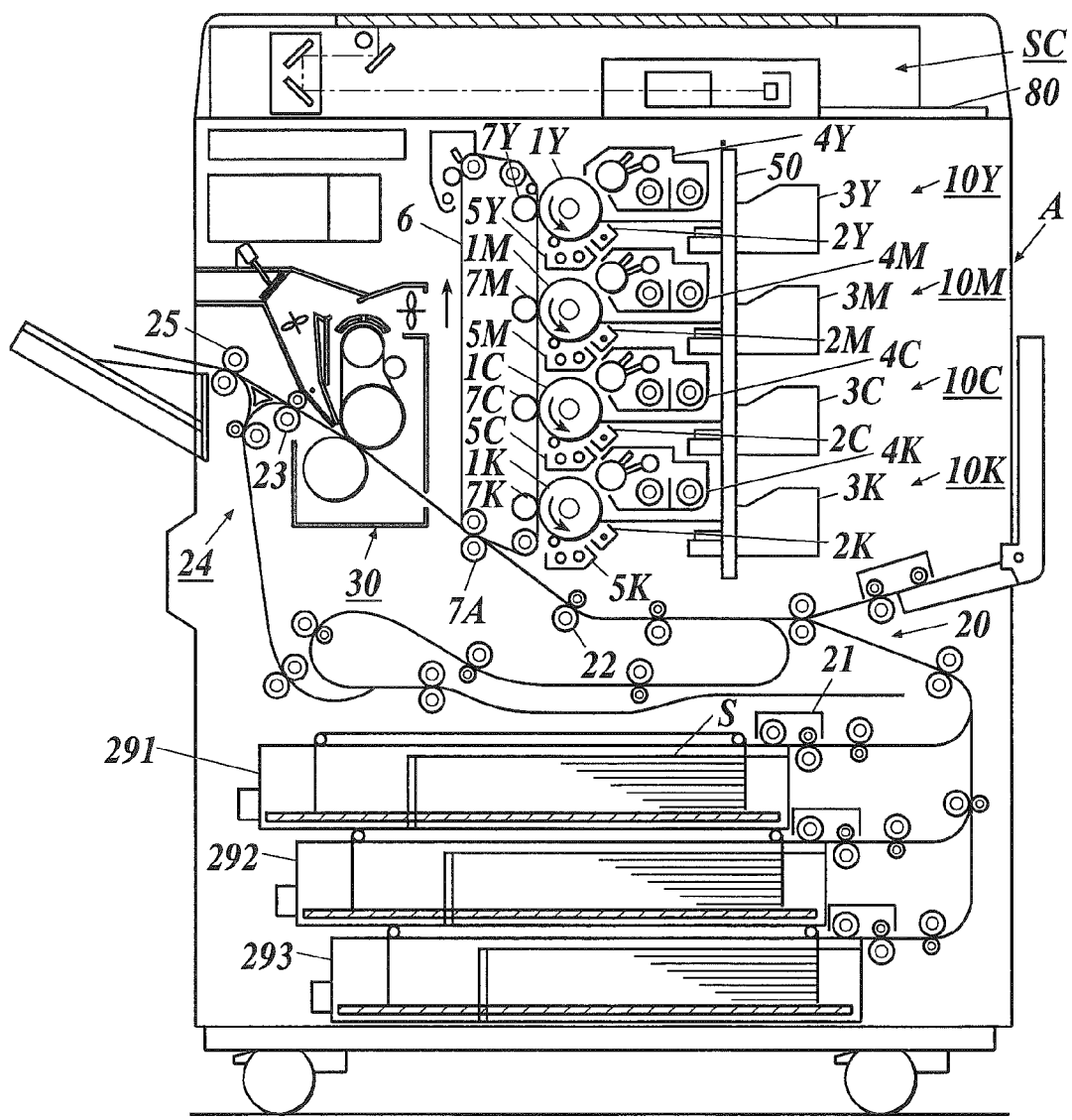
FIG. 1 illustrates an image forming apparatus A according to the present invention.
Figure 2:
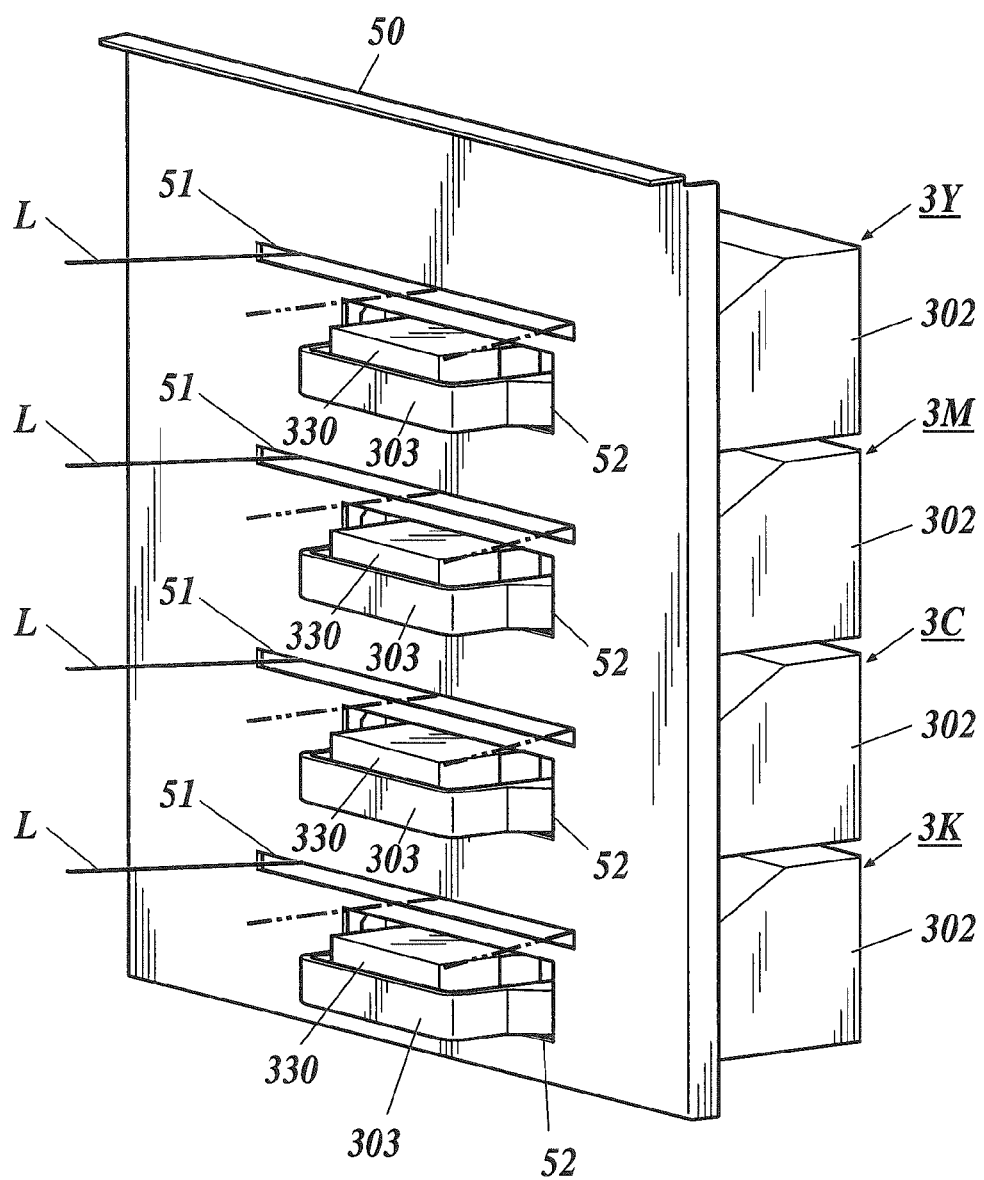
FIG. 2 is a perspective view illustrating an exemplary configuration of a scanning optical device and a partition wall.
Figure 3:
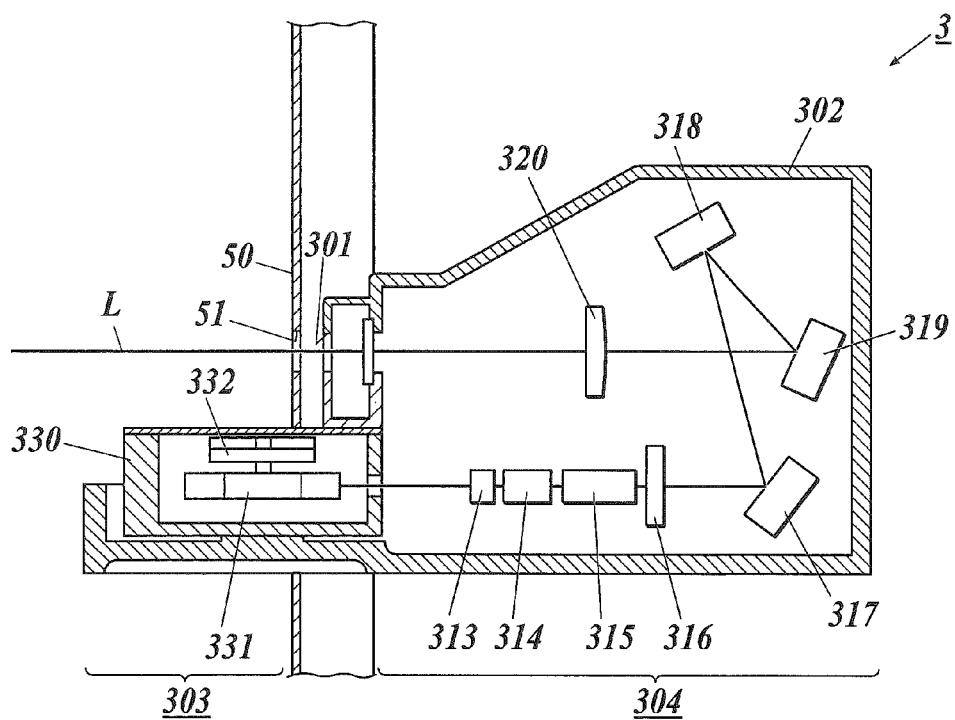
FIG. 3 illustrates an exemplary internal configuration of a scanning optical device.
Figure 4:
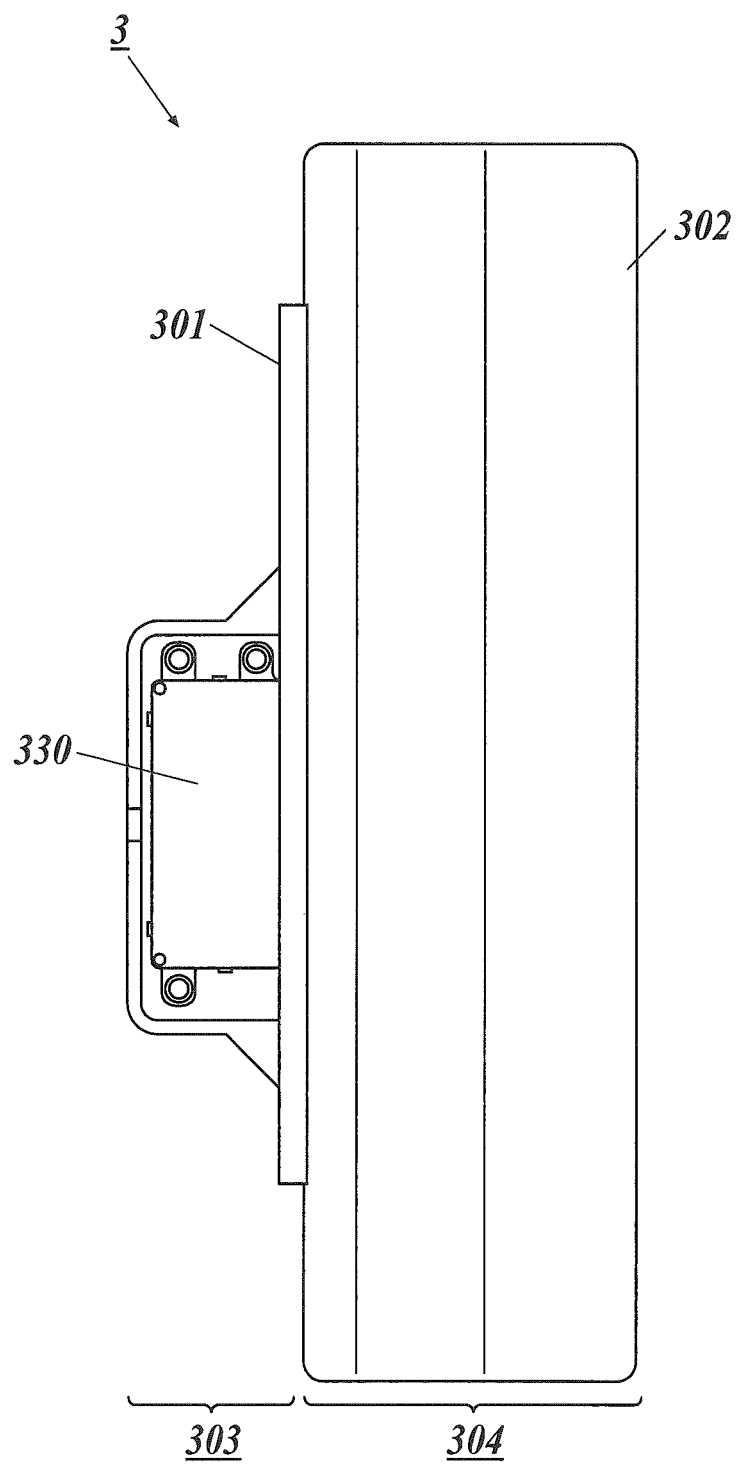
FIG. 4 illustrates an exemplary exterior shape of a scanning optical device viewed from above the image forming apparatus A shown in FIG. 1.
Figure 5:
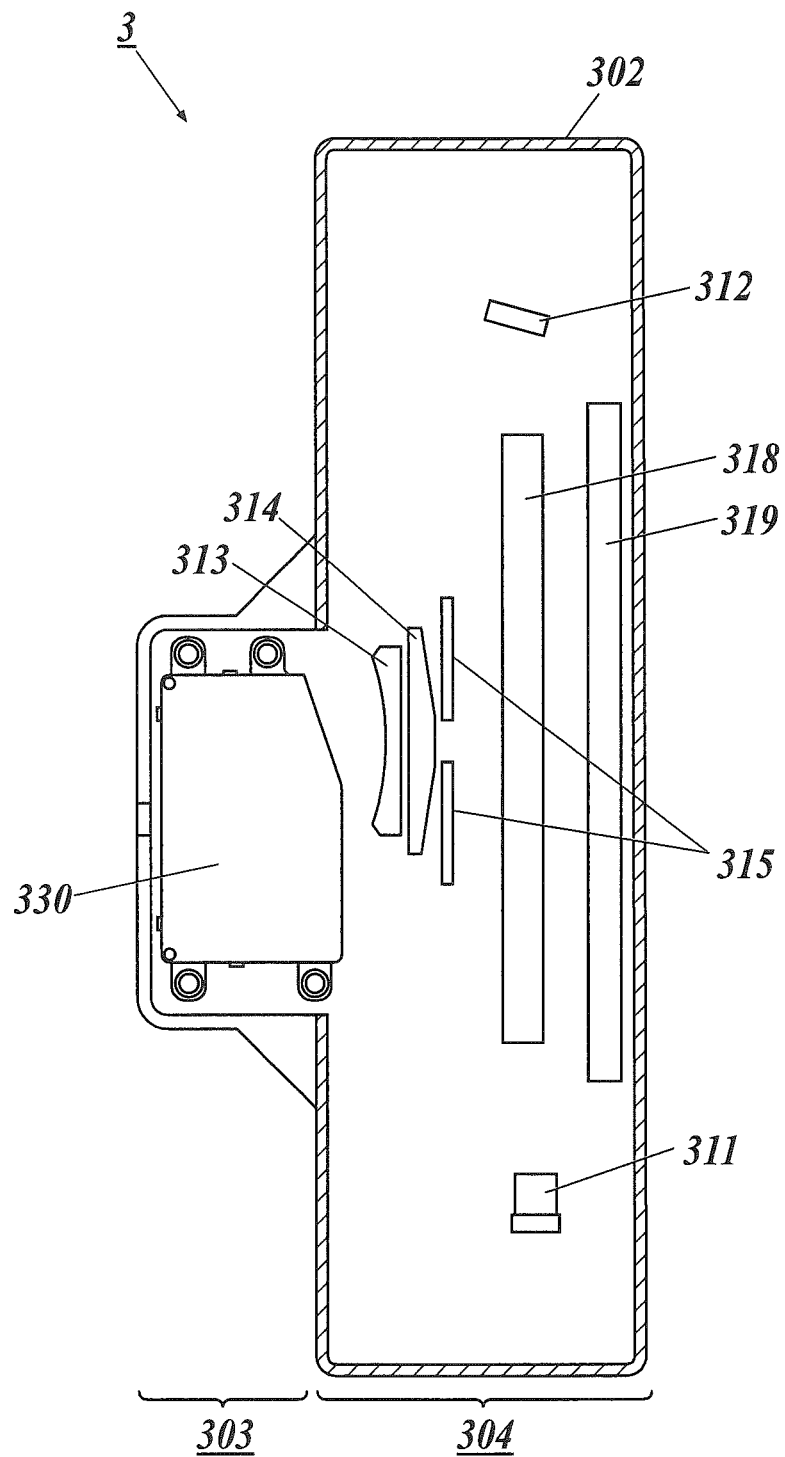
FIG. 5 illustrates an exemplary internal configuration of the scanning optical device shown in FIG. 4.
Figure 6:
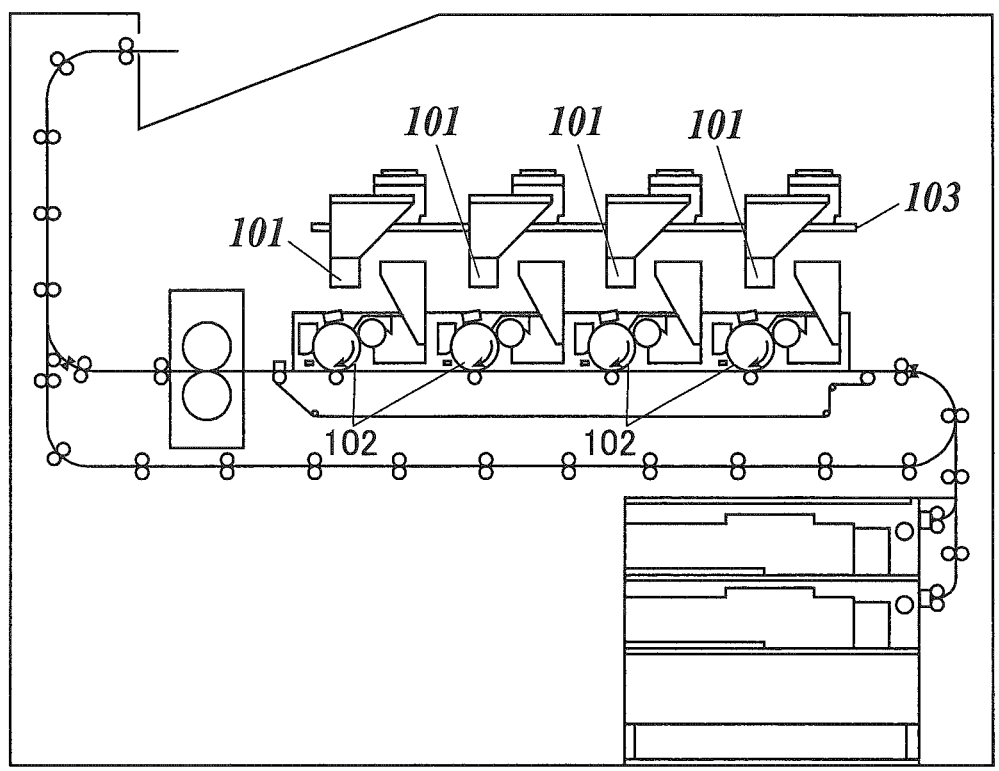
FIG. 6 illustrates a typical configuration of a conventional image forming apparatus.

FIG. 1 illustrates the image forming apparatus A according to the present invention.

The image forming apparatus A is a tandem color image forming apparatus, which has four image forming units to form a color image.

An image of a document placed on a document plate is scanned and exposed with an optical system of a scanning exposure device of an image scanner SC and is read into a line image sensor. Photoelectrically-converted image data signals undergo analog processing, A/D conversion, shading correction, and image compression in an image processor (not shown in the drawing), and then are supplied to a scanning optical device in each of the image forming units.

The four image forming units include an image forming unit 10Y to form an image in yellow (Y), an image forming unit 10M to form an image in magenta (M), an image forming unit 10C to form an image in cyan (C), and an image forming unit 10K to form an image in black (K). The alphabetical references Y, M, C, and K that represent the respective colors are suffixed to the common numerical reference 10.

The image forming unit 10Y has a photoreceptor drum 1Y, a charging section 2Y disposed around the photoreceptor drum 1Y, a scanning optical device 3Y, a developing device 4Y, and a drum cleaner 5Y.

Similarly, the image forming unit 10M has a photoreceptor drum 1M, a charging section 2M disposed around the photoreceptor drum 1M, a scanning optical device 3M, a developing device 4M, and a drum cleaner 5M; the image forming unit 10C has a photoreceptor drum 1C, a charging section 2C disposed around the photoreceptor drum 1C, a scanning optical device 3C, a developing device 4C, and a drum cleaner 5C; the image forming unit 10K has a photoreceptor drum 1K, a charging section 2K disposed around the photoreceptor drum 1K, a scanning optical device 3K, a developing device 4K, and a drum cleaner 5K.

The photoreceptor drums 1Y, 1M, 1C, and 1K in the image forming units 10Y, 10M, 10C, and 10K, respectively, have a common construction. Similarly, the charging sections 2Y, 2M, 2C, and 2K; the scanning optical devices 3Y, 3M, 3C, and 3K; the developing devices 4Y, 4M, 4C, and 4K; and the drum cleaners 5Y, 5M, 5C, and 5K each have a common construction. The alphabetical references Y, M, C, and K are not included in the description below unless it is necessary to particularly distinguish them.

In the image forming unit 10, image data signals are written onto the photoreceptor drum 1 by laser light L from the scanning optical device 3 to form a latent image on the photoreceptor drum 1 based on the image data signals. Then, the latent image is developed by the developing device 4 to form a toner image as a visible image on the photoreceptor drum 1.

Images in yellow (Y), magenta (M), cyan (C), and black (K) are formed on the respective photoreceptor drums 1Y, 1M, 1C, and 1K of the image forming units 10Y, 10M, 10C, and 10K, respectively.

An intermediate transfer belt 6 is stretched over a plurality of rollers and is movably supported thereby.

The toner images in the respective colors formed by the image forming units 10Y, 10M, 10C, and 10K are sequentially transferred onto the moving intermediate transfer belt 6 by primary transfer sections 7Y, 7M, 7C, and 7K, and thereby a color image is formed composed of overlapped color layers of Y (yellow), M (magenta), C (cyan), and K (black).

A paper conveying section 20 conveys paper S. The paper S is stored in paper feeding trays 291, 292, and 293, fed by a paper feeder 21, and conveyed to a secondary transfer section 7A through registration rollers 22. The color image on the intermediate transfer belt 6 is then secondarily transferred onto the paper S. The toner images are fixed on the paper S by heat and pressure applied by a fixing device 30. The paper S passes through fixing/conveying rollers 23 and paper ejecting rollers 25 and is ejected to the exterior of the apparatus.

The image forming apparatus A has a paper turning-over section 24. The paper on which a toner image has been fixed is sent from the fixing/conveying rollers 23 to the paper turning-over section 24, which turns over the paper and ejects it. Furthermore, the paper turning-over section 24 allows images to be formed on two sides of a paper sheet.

The size and number of the paper sheets S for image forming can be set on an operation display 80 in the upper portion of the main body of the image forming apparatus A.

The image forming apparatus A has a partition wall 50.

The partition wall 50 is a plate that separates a light outputting section 301 of the scanning optical device 3 from the photoreceptor drum 1.

The partition wall 50 is fixed to a chassis, to which each of the components of the image forming apparatus A is fixed. The scanning optical device 3 of the embodiment is fixed to the partition wall 50. That is, the partition wall 50 makes it possible to maintain the positional relationship between the scanning optical device 3 and the photoreceptor drum 1.

The scanning optical device 3 scans the photoreceptor drum 1 with the laser light L.

Specifically, the scanning optical device 3 has, for example, a light source 311 that emits the laser light L; a mirror 312 that reflects the laser light L from the light source 311 toward a polygon motor unit 330; and a plurality of lenses 313, 314, 315, 316, and 320 and a plurality of mirrors 317, 318, and 319, which serve as an optical system provided on a path of the laser light L from the polygon motor unit 330 to the light outputting section 301. Those lenses and mirrors change the traveling direction of the laser light L to allow the laser light L to travel to the light outputting section 301.

The polygon motor unit 330 has, for example, a polygon mirror 331 being a multifaceted mirror that reflects the laser light L reflected by the mirror 312 and a polygon motor 332 that rotates the polygon mirror 331.

The polygon mirror 331 is a polygonal member centering the rotation axis of the polygon motor 332. Peripheral surfaces thereof that correspond to sides of a polygonal shape are mirrors to reflect the laser light L. Driven by the polygon motor 332, the polygon mirror 331 rotates and changes the angle of the laser light L directed to the polygon motor unit 330. Specifically, the polygon motor 332 rotates the polygon mirror 331 such that the laser light L reflected by the polygon mirror 331 forms an electrostatic latent image on the photoreceptor drum 1 based on image data. The polygon mirror 331 is rotated driven by the polygon motor 332, and thereby, changes the reflection angle of the laser light L directed to the polygon motor unit 330, in accordance with the rotation of the polygon mirror 331. The reflection angle of the laser light L, which changes in accordance with the rotation of the polygon mirror 331, is an angle with respect to a main scanning direction along the axis of the photoreceptor drum 1.

The laser light L reflected by the polygon mirror 331 is allowed to travel to the light outputting section 301 through refraction by the lenses 313 to 316 and 320 and reflection by the mirrors 317 to 319, and is output through the light outputting section 301 onto the photoreceptor drum 1. That is, the angle at which the laser light L is radiated onto the photoreceptor drum 1 from the light outputting section 301 in the main scanning direction along the axis of the photoreceptor drum 1 is determined in accordance with the rotation angle of the polygon mirror 331.

The light outputting section 301 is disposed on a side surface of a main housing 304 of the scanning optical device 3, the main housing 304 being provided in a position separated from the photoreceptor drum 1 by the partition wall 50. The partition wall 50 has an opening 51 through which the laser light L from the scanning optical device 3 is to pass to be delivered to the photoreceptor drum 1. Specifically, the laser light L output from the light outputting section 301 passes through the opening 51, and is radiated to the photoreceptor drum 1.

The housing 302 of the scanning optical device 3 has a projection 303 projecting through the partition wall 50 toward the photoreceptor drum 1. The projection 303 is provided so as to project toward the photoreceptor drum 1 from a side surface of the main housing 304 at which the light outputting section B301 is provided.

The partition wall 50 has an opening 52 through which the projection 303 extends. The scanning optical device 3 and the developing device 4 are positioned such that the projection 303 and the developing device 4 do not interfere with each other.

The polygon motor unit 330 of the embodiment is provided in the projection 303. Specifically, the projection 303 contains the polygon mirror 331 that reflects the laser light L to be output through the light outputting section 301 and the polygon motor 332 that rotates the polygon mirror 331.

Although the polygon motor 332 generates heat due to driving, the heat does not substantially have an influence on the lenses 313, 314, 315, 316, and 320 and the mirrors 312, 317, 318, and 319. That is because the projection 303, which contains the polygon motor unit 330, projects toward the photoreceptor drum 1 from the partition wall 50, and thus, the polygon motor 332, which generates heat, is separated from the lenses and mirrors by the partition wall 50. Furthermore, since the polygon motor 332 as a heat source is provided in the projection 303 projecting through the partition wall 50, outside air around the projection 303 promotes cooling of the polygon motor 332.

The optical system, i.e., the lenses 313, 314, 315, 316, and 320 and the mirrors 312, 317, 318, and 319, which change the traveling direction of the laser light L, are contained in the main housing 304.

The lenses 313, 314, 315, 316, and 320 and the mirrors 312, 317, 318, and 319 may vary the reflection angle and refraction angle of the light depending on variation of temperature. It is thus desirable to separate the lenses and mirrors from the polygon motor 332 whose temperature varies. The partition wall 50, which separates the lenses 313, 314, 315, 316, and 320 and the mirrors 312, 317, 318, and 319 from the photoreceptor drum 1, allows these lenses and mirrors to be separated from the polygon motor 332. As a result, the influence of the heat from the polygon motor 332 on the lenses and mirrors is reduced. This further enhances the accuracy of adjusting the traveling direction of the laser light L with the lenses 313, 314, 315, 316, and 320 and the mirrors 312, 317, 318, and 319.

According to the image forming apparatus A of the embodiment, the scanning optical device 3 has the projection 303 that projects through the partition wall 50 toward the photoreceptor drum 1 and that contains a portion of the scanning optical device, thus reducing the space for disposing the photoreceptor and the scanning optical device. This reduces the size of the image forming apparatus A, for instance. Furthermore, reducing the space between the scanning optical device 3 and the photoreceptor drum 1 enhances flexibility in designing of the image forming apparatus A. For example, a larger space can be used for other components, such as toner cartridges.

In the scanning optical device 3, the light outputting section 301, through which the laser light L is to be output onto the photoreceptor drum 1, is separated from the photoreceptor drum 1 by the partition wall 50. Since the light outputting section 301 and the photoreceptor drum 1 are separated from each other by the partition wall 50, particles such as toner scattered from the photoreceptor drum 1 do not adhere to the light outputting section 301. In other words, the light outputting section 301 is not contaminated by particles such as toner, and thus radiation of the laser light L is not prevented due to contamination.

In the image forming apparatus A having the scanning optical device 3 in the embodiment that partially projects through the partition wall 50 toward the photoreceptor drum 1, contamination of the light outputting section 301 of the scanning optical device 3 is prevented.

The projection 303 contains the polygon mirror 331 that reflects the laser light L in the scanning optical device 3 and the polygon motor 332 that rotates the polygon mirror 331. Thus, the polygon motor 332, which generates heat, can be separated from other components that are provided on the other side of the partition wall 50. As a result, the influence of the heat on the other components is reduced.

Furthermore, the polygon motor 332, which generates heat, is provided in the projection 303 projecting through the partition wall 50. Accordingly, the polygon motor 332 can be cooled by outside air around the projection 303.

The scanning optical device 3 has the optical system including a plurality of the lenses 313, 314, 315, 316, and 320 and a plurality of the mirrors 317, 318, and 319. These lenses and mirrors change the traveling direction of the laser light L, emitted from the light source 311, to allow the laser light L to travel to the light outputting section 301. The optical system is separated from the polygon motor 332, which is contained in the projection 303. As a result, the influence of heat from the polygon motor 332 on the optical system can be reduced. This further enhances the accuracy of adjusting the traveling direction of the laser light L with the optical system, which is provided separately from the photoreceptor drum 1 with the partition wall 50 in between.

The disclosed embodiment of the present invention is presented merely as an example in all aspects and shall not be construed as a limitation. The scope of the present invention is recited in the claims, not in the description above, and is intended to include the scope of the claims, its equivalents, and all modifications within the scope.

For instance, the scanning optical device 3 is fixed to the partition wall 50 in the embodiment above. This is merely an example of a method for fixing the scanning optical device, and the method for fixing is not limited thereto. The partition wall does not necessarily need to fix the scanning optical device, as long as the partition wall is provided so as to separate the photoreceptor from the scanning optical device.

In the embodiment above, a plurality of the scanning optical devices 3 and a plurality of the photoreceptor drums 1 are provided for the plurality of colors, respectively, and are arranged vertically. This is merely an example of a method for arranging a plurality of the scanning optical devices 3 and a plurality of the photoreceptor drums 1, and the method for the arrangement is not limited thereto. Instead, a plurality of the scanning optical devices 3 and a plurality of the photoreceptor drums 1 may be arranged horizontally, for example, depending on the position of the intermediate transfer belt.

The polygon motor unit 330 provided in the projection 303 in the embodiment above contains the polygon mirror 331 and the polygon motor 332. Alternatively, the projection 303 may contain the polygon motor 332 alone and the main housing 304 may contain the polygon mirror 331. Specifically, for example, the drive axis of the polygon motor 332 in the projection 303 and the rotation axis of the polygon mirror 331 in the main housing 304 may be connected to each other by a connector, such as a belt or a gear.

Furthermore, projecting pieces that project toward the photoreceptor drum 1 may be provided along edges of the opening 51 for passing of the laser light in the partition wall 50. Thus, the partition wall more effectively prevents contamination of the light outputting section from which the laser light is to be output.

The entire disclosure of Japanese Patent Application No. 2011-123870 filed on Jun. 2, 2011 including description, claims, drawings, and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:

1. A scanning optical device that scans a photoreceptor with laser light, the scanning optical device comprising:
   a light source;
   a light outputting section through which the laser light from the light source is output so that the photoreceptor is irradiated with the laser light; and
   a projection that projects through a partition wall toward the photoreceptor, wherein
   the light outputting section is disposed in a position separated from the photoreceptor by the partition wall; and
   the projection contains a polygon motor that rotates a polygon mirror to reflect the laser light.

2. The scanning optical device according to claim 1, further comprising:
   an optical system that changes a traveling direction of the laser light from the light source to allow the laser light to travel to the light outputting section, wherein
   the optical system is disposed in a position separated from the photoreceptor by the partition wall.

3. An image forming apparatus comprising:
a photoreceptor;
a scanning optical device that scans the photoreceptor with laser light;
a partition wall that separates the scanning optical device from the photoreceptor;
a developing device that develops an electrostatic latent image formed on the photoreceptor with the laser light from the scanning optical device to form a toner image;
a transfer section that transfers the toner image formed on the photoreceptor onto paper; and
a fixing device that fixes the toner image on the paper, wherein
the scanning optical device comprises:
   a light source;
   a light outputting section through which the laser light from the light source is output so that the photoreceptor is irradiated with the laser light; and
   a projection that projects through the partition wall toward the photoreceptor, wherein
   the light outputting section is disposed in a position separated from the photoreceptor by the partition wall; and
   the projection contains a polygon motor that rotates a polygon mirror to reflect the laser light.

4. A scanning optical device that scans a photoreceptor with laser light, the scanning optical device comprising:
a light source;
a light outputting section through which the laser light from the light source is output;
a housing that includes the light outputting section and that contains an optical system to change a traveling direction of the laser light from the light source to allow the laser light to travel to the light outputting section, wherein
the housing comprises a projection that projects from the light outputting section through a partition wall toward the photoreceptor;
the projection contains a polygon motor that rotates a polygon mirror to reflect the laser light; and
the light outputting section is disposed in a position separated from the photoreceptor by the partition wall.

* * * * *